UNITED STATES PATENT OFFICE.

LOUIS CHARLES REESE, OF SOUTHFIELDS, LONDON, ENGLAND.

MANUFACTURE OF MALTED PREPARATIONS FROM CEREALS.

974,597. Specification of Letters Patent. Patented Nov. 1, 1910.

No Drawing. Application filed August 18, 1908. Serial No. 449,138.

*To all whom it may concern:*

Be it known that I, LOUIS CHARLES REESE, a subject of the Emperor of Germany, residing at Southfields, in the county of London, England, have invented Improvements in the Manufacture of Malted Preparations from Cereals, of which the following is a specification.

This invention relates to improvements in the process of manufacturing easily digestible malted alimentary preparations from cereals and it has for its object to accelerate the process of saccharification and following filtration and to increase the nourishing value of the food preparations obtained thereby. To this end, when mixing a portion of malted cereal with a portion of unmalted cereal and water, bran or similar covering or offal of the milling process (hereinafter referred to as bran) is incorporated with the said cereals and water and the mixture heated to and maintained at the most efficient temperature for causing the diastase present to bring about the conversion into sugar of the starch in the mixture. The mixture is then filtered and the filtered liquid evaporated *in vacuo*. The presence of the bran accelerates the saccharification of the starch by the diastase of the malted portion of the cereal mixture, probably by means of the action of the diastase element crealin and the acid compounds contained in the bran, and the voluminousness of the latter gives to the undissolved remainder of the mixture a loose texture which facilitates and quickens the subsequent filtration. The extract obtained from the bran simultaneously with the saccharification of the starch of the cereals used, enriches the resulting solution with the very large amount of soluble albuminoids and organic phosphorus compounds contained in the bran and it is for this reason that the food preparation finally obtained contains a considerably higher percentage of these components than is the case when the food has been prepared without the addition of bran.

The following describes one way in which the improved process can advantageously be carried into practice. About eight parts by weight of malted cereals, thirty to thirty five parts by weight of unmalted cereals, ten parts by weight of bran and about three hundred parts by weight of water having a temperature of about 55° C. (fifty five degrees centigrade) are mixed together in a vat provided with a stirring device and a steam inlet, the stirring device being kept at work during the operation, and steam being introduced into the mass until the temperature thereof reaches about 65° to 68° C. (sixty five to sixty eight degrees centigrade). As soon as the starch contained in the mixture has been converted, the mass is filtered in a filter press and the clear filtrate evaporated in a vacuum pan.

In order to completely utilize all obtainable nourishing parts of the materials treated, the filter cake obtained as the result of the filtration above referred to, may be at once heated with water under pressure to a temperature of say from about 110° to 130° C. (one hundred and ten to one hundred and thirty degrees centigrade) for some hours. The mixture is then filtered and the filtered liquid added to and evaporated with the liquid obtained by the first filtration.

It is to be understood that the proportions of ingredients and the temperatures hereinbefore mentioned are given merely by way of example and that my invention is not limited to such proportions and temperatures as these may be varied so long as the required result is obtained.

What I claim is:—

1. A process for the manufacture of malted food preparations from cereals, said process consisting in adding free bran to malted and unmalted cereals and water, digesting the mixture under heat so as to effect saccharification of the starch in the cereals and extraction of albuminoids and organic phosphoric compounds from the added bran, and filtering off the mixed extracts.

2. A process for the manufacture of malted food preparations from cereals, said process consisting in adding free bran to malted and unmalted cereals and water, digesting the mixture under heat so as to effect saccharification of the starch in the cereals and extraction of albuminoids and organic phosphoric compounds from the added bran, filtering off the mixed extracts and concentrating the filtrate.

3. A process for the manufacture of malted food preparations from cereals, said process consisting in adding free bran to malted and unmalted cereals and water, digesting the mixture under heat so as to effect saccharification of the starch in the cereals and extraction of albuminoids and organic phosphoric compounds from the added bran, filtering off the mixed extracts and concentrating them *in vacuo*.

4. A process for the manufacture of malted food preparations from cereals, said process consisting in adding free bran to malted and unmalted cereals and water, digesting the mixture at a temperature below 100° C., filtering off the mixed extracts obtained from the cereals and added bran, and concentrating the filtrate.

5. A process for the manufacture of malted food preparations from cereals, said process consisting in adding free bran to malted and unmalted cereals and water, digesting the mixture at a temperature suitable for effecting saccharification of the starch in the cereals and extraction of albuminoids and organic phosphoric compounds from the added bran, filtering off the resulting mixed extracts, digesting the resulting solid portion of the mixture with water, under heat and pressure, filtering off the resulting extract, adding such extract to those first obtained and concentrating the mixed extracts.

6. A process for the manufacture of malted food preparations from cereals, said process consisting in adding free bran to malted and unmalted cereals and water, digesting the mixture at a temperature below 100° C., filtering off the mixed extracts obtained from the cereals and added bran, digesting the resulting solid portion of the mixture with water at a temperature above 100° C., filtering off the resulting extract, adding such extract to those first obtained and concentrating the mixed extracts *in vacuo*.

7. A process for the manufacture of malted food preparations from cereals, said process consisting in mixing together, by weight, about eight parts of malted cereals, thirty to thirty five parts of unmalted cereals, ten parts of bran and three hundred parts of water, heating the mixture by steam to a temperature of about 65° to 68° C., and afterward filtering off the resulting extracts.

8. A process for the manufacture of malted food preparations from cereals, said process consisting in mixing together, by weight, about eight parts of malted cereals, thirty to thirty five parts of unmalted cereals, ten parts of bran and three hundred parts of water, heating the mixture by steam to a temperature of about 65° to 68° C., and afterward filtering off the resulting extracts and evaporating the same *in vacuo*.

Signed at Southfields, London, England, this thirty-first day of July 1908.

LOUIS CHARLES REESE.

Witnesses:
 JOHN HUBERT LEE,
 WILLIAM JAMES BAKER.